C. GLIDDEN.
Car Spring.
No. 59,384.    Patented Nov. 6, 1866.
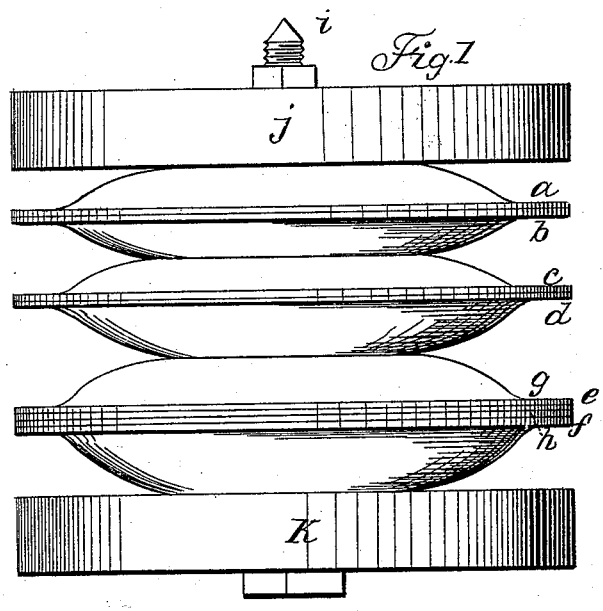
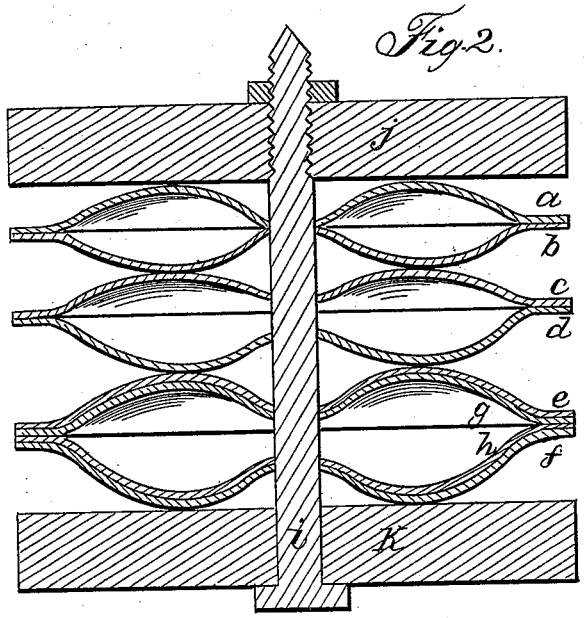
Witnesses
T. Smith
L. Jones
Inventor
Carlos Glidden
by Atty T. T. Everett

UNITED STATES PATENT OFFICE.

CARLOS GLIDDEN, OF MILWAUKEE, WISCONSIN.

IMPROVED CAR-SPRING.

Specification forming part of Letters Patent No. 59,384, dated November 6, 1866.

*To all whom it may concern:*

Be it known that I, CARLOS GLIDDEN, of the city of Milwaukee, in the State of Wisconsin, have invented a certain new and useful Improvement in Springs for Cars and Vehicles; and I do hereby declare that the following is a full, clear, and exact description of the same, reference being had to the accompanying drawings, and to the letters and marks thereon, which said drawings form part of this specification, and show—

By Figure 1, a view in elevation, and by Fig. 2 a view by vertical section, of springs constructed under my invention.

The springs which are the subject of this application are made by cutting circular plates or disks out of sheet or plate steel and then corrugating them, the corrugations surrounding the center or being in lines concentric with the periphery of the circular plate or disk. These plates or disks can readily be cut out and swaged into form by the usual means for cutting out and swaging sheet or plate metal.

The drawings show three sets of springs, arranged with their concave surfaces opposite to each other, like one saucer or dish covering the other, the upper of the three sets, *a* and *b*, touching or coming in contact with each other at the edges and at the center, the middle of the three sets, *c* and *d*, touching at the edges only, and the lowest of the three, *e* and *f*, also touching at the edges only, while the lowest set is made up of two other disks, *g* and *h*, being thus double or compound. These springs may be held in place by a rod, *i*, passing through holes in the center and secured to suitable heads, *j* and *k*; or they may be kept in place by being confined in a cylinder and acting on them with a plunger.

As is evident, these springs may have the corrugations at any point from the center, or between the periphery and the center, so that the bearing-surfaces or the surfaces touching each other may be at the periphery or center, or at any point or points between the two; and one pair of disks may make a set, or two, or any other desired number.

In some instances it may be preferable to have the disks of varying thickness, so that the degree of stiffness at one or more points of the disk will be greater than at others; and the disks or circular plates may be swaged into the cup or saucer form, or into such other form as may be desirable.

What I claim as my invention, and desire to secure by Letters Patent, is—

Making springs out of disks or circular plates of steel, with corrugations in circular lines, or concentric with the periphery of the disk or circular plate, substantially as herein set forth.

This specification signed this 25th day of July, 1866.

CARLOS GLIDDEN.

Witnesses:
EWD. P. ALLIS,
W. G. FITCH.